P. H. Cummings,
Dovetailing Machine.

No. 109,591.         Patented Nov. 29, 1870.

2 Sheets. Sheet 1.

Witness
Wm Franklin Savery
George E. Ries

Inventor
Perley H. Cummings
Per Wm Henry Clifford Attorney

P. H. Cummings,

Dovetailing Machine.

No. 109,591. Patented Nov. 29, 1870.

Plate 2.

United States Patent Office.

PERLEY D. CUMMINGS, OF PORTLAND, MAINE.

Letters Patent No. 109,591, dated November 29, 1870.

IMPROVEMENT IN MACHINES FOR MAKING KEY-BOARDS FOR WOOD PAVEMENTS.

The Schedule referred to in these Letters Patent and making part of the same.

*To all whom it may concern:*

Be it known that I, PERLEY D. CUMMINGS, of Portland, in the county of Cumberland and State of Maine, have invented a new and useful Machine for Making Tongued Key-Boards for Wooden Pavements; and I hereby declare the following to be a full, clear, and exact description thereof, reference being had to the accompanying drawing, in which—

Figure 2:
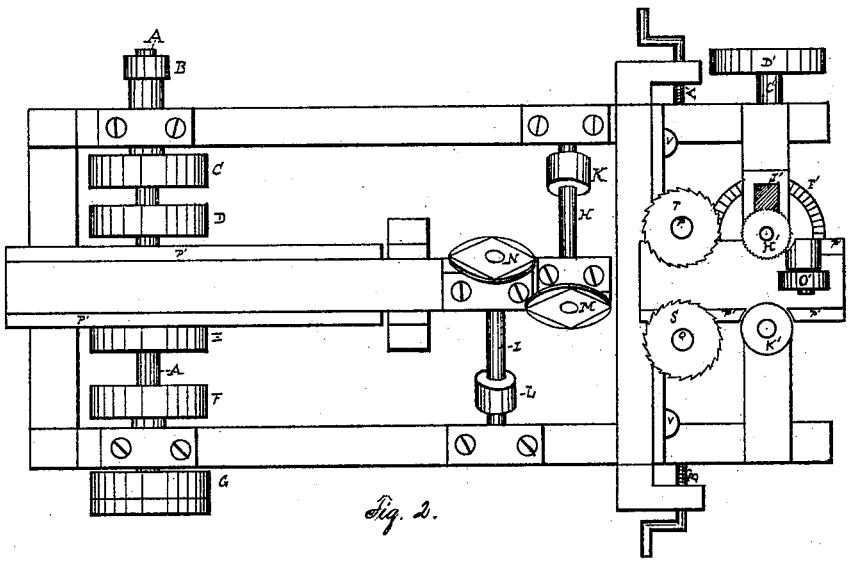
Figure 1:
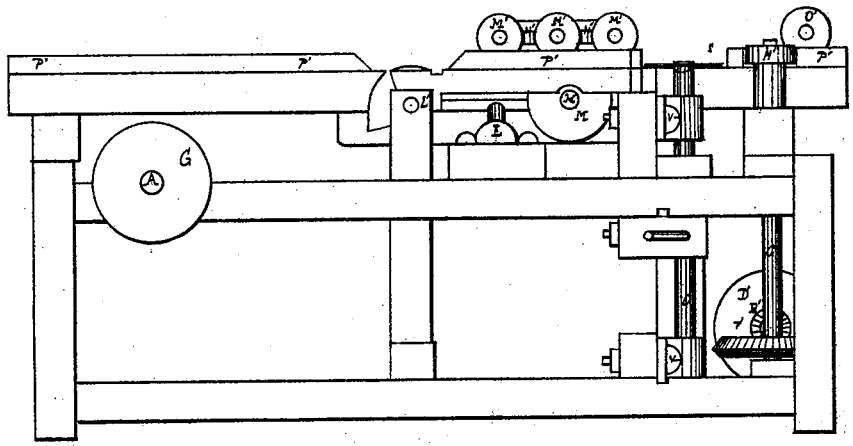
Figure 2:
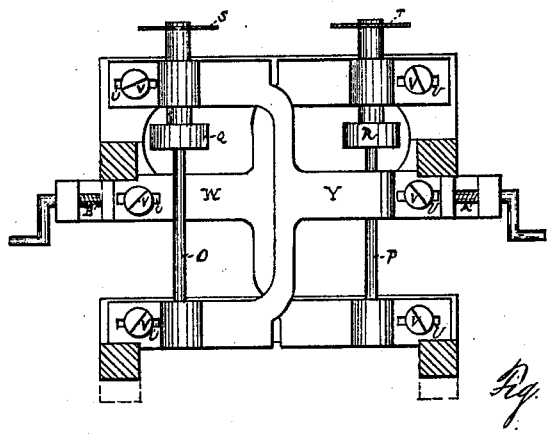
Figure 1:
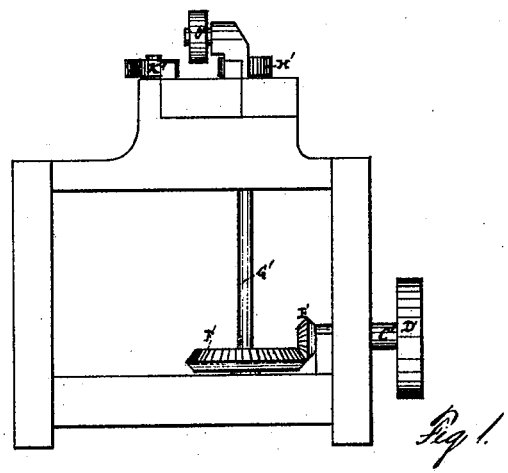

Plate 1, Figure 1, is a side elevation;

Figure 2 is a top plan; and

Plate 2, fig. 1, is an end view of same; and

Figure 2 is an end view of the device for regulating the distance between the two horizontal cutters or saws.

Same letters refer to like parts.

The main shaft of the machine A is a horizontal shaft, provided with six band-wheels, B, C, D, E, F, and G.

Near the other end of the machine are the two inclined shafts H and I, having band-wheels K and L, and upon their inner extremities the inclined cutters M and N, converging toward each other.

The wheels F and L and C and K are connected by bands.

Beyond the shafts H and I are the two vertical shafts O and P, containing band-wheels Q and R and saws S and T respectively, the saws being fixed upon the upper extremities of said shafts, and in the same plane with the upper edges of the cutters M and N.

These shafts O and P are fixed, each in a frame allowing lateral motion.

This motion is effected by the screws A' and B', the frames W and Y having horizontal slots in their outer edges, through which slots, U U, the screws V V are inserted into the frame of the machine, (see plate 2, fig. 2.)

The wheels Q and E and D and R are banded together, the belts being turned to the left and right respectively.

At the right of the end of the machine is the horizontal shaft C', having on its outer extremity the band-wheel D', and on its inner extremity the beveled-gear E'.

This beveled-gear E' matches into the beveled-gear F' upon the vertical shaft G'.

On the upper part of the shaft G' is the toothed feed H', (see plate 2, fig. 1.)

The wheels D' and B are banded together by a cross-belt.

The feeder H' is rendered adjustable by means of the spring I', plate 1, fig 2.

Opposite the feed H' is the roller K', while above the feed is the roller or guide O'.

The central and upper part of the machine is furnished with a horizontal platform or table extending the length of the machine and directly beneath the feeder and roller H' and K' and the saws S and T.

The portion of the platform over the cutters M and N is movable, being hinged or pivoted at L'.

This portion of the platform is slotted to allow an arc of the cutters M and N to pass through the same.

Above and to the right of the cutters M and N are the independent rollers M' M' and N' N', the latter being rendered adjustable by springs placed between the axes of the rollers and the frame of the machine.

The sides of the platform are also provided with the guides P' P', placed as shown in plate 1, figs. 1 and 2.

I have already applied for Letters Patent on an improved machine for cutting key-ways in blocks for wooden pavements. The object of the above-described machine is to provide a suitable device for cutting key-boards to fit the key-ways in the blocks and connect the same.

In operating the machine, power is applied to the band-wheel G.

The board or plank of which the key-board is to be manufactured is placed on the platform beneath the guide O', between the feed H' and the roller K'.

It is carried by the feed in contact with the saws S and T, by which an incision is made into each edge of the board.

The board is next carried over the cutters M and N which free the outer and lower portions of same, having on its lower surface a dovetailed-shaped tongue.

It is then carried over the platform to the other end of the machine, where it may be removed.

It is evident that a key-board of the same shape could be produced by means of the cutters M and N alone, if increased in width, thus doing away with the saws S and T; but the same could be done only at the expense of loss of power and material.

By the above-described method not only is power saved, but the thin strips thus removed can be utilized in many ways, as for laths, &c.

What I claim as my invention, and desire to secure by Letters Patent of the United States, is—

The combination of the saws S and T, rollers M' M' and N' N', with the converging cutters M and N, substantially as described.

PERLEY D. CUMMINGS.

Witnesses:
WM. FRANKLIN SEAVEY.
GEORGE E. BIRD.